United States Patent
Bender et al.

(10) Patent No.: US 10,672,241 B2
(45) Date of Patent: Jun. 2, 2020

(54) PREVENTING ANONYMOUS THEFT BY DRONES

(71) Applicant: INTERNATIONAL BUSINESS MACHINES CORPORATION, Armonk, NY (US)

(72) Inventors: Michael Bender, Rye Brook, NY (US); Jeremy R. Fox, Georgetown, TX (US); Todd R. Palmer, Danbury, CT (US); Manjari Roy, Danbury, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/546,669

(22) Filed: Aug. 21, 2019

(65) Prior Publication Data
US 2019/0378386 A1 Dec. 12, 2019

Related U.S. Application Data

(63) Continuation of application No. 15/960,933, filed on Apr. 24, 2018, now Pat. No. 10,475,306.

(51) Int. Cl.
*G08B 13/14* (2006.01)
*G06Q 50/28* (2012.01)

(52) U.S. Cl.
CPC .......... *G08B 13/14* (2013.01); *G06Q 50/28* (2013.01)

(58) Field of Classification Search
None
See application file for complete search history.

(56) References Cited

U.S. PATENT DOCUMENTS

| 4,190,828 A | 2/1980 | Wolf |
| 5,317,304 A | 5/1994 | Choi |
| 5,374,932 A * | 12/1994 | Wyschogrod ........... G01S 13/91 342/29 |
| 5,434,559 A | 7/1995 | Smiley et al. |
| 5,519,618 A * | 5/1996 | Kastner ................... G01S 13/91 701/120 |

(Continued)

OTHER PUBLICATIONS

Grabham, "Creating Package Guard—Package Guard". https://www.thepackageguard.com/founder-story/creating-package-guard/, Sep. 20, 2017, 2 pages.

(Continued)

*Primary Examiner* — Steven Lim
*Assistant Examiner* — Muhammad Adnan
(74) *Attorney, Agent, or Firm* — Brian Restauro; Andrew D. Wright; Roberts Calderon Safran & Cole, P.C.

(57) ABSTRACT

Methods and systems for tracking objects are provided. A method includes: accessing, by a tracking server, a secure database that stores data about an object of personal property; determining, by the tracking server and from the data about the object, that a tracking state of the object is set to ON; obtaining, by the tracking server and in response to the determining, altitude data from an altitude sensor of an Internet of Things (IoT) device associated with the object; comparing, by the tracking server, the altitude data to a predefined criteria; and repeating, by the tracking server, the obtaining and the comparing until one of: the altitude data satisfies the predefined criteria, or the tracking state of the object is set to OFF.

10 Claims, 3 Drawing Sheets

(56) References Cited

U.S. PATENT DOCUMENTS

| | | | |
|---|---|---|---|
| 5,963,131 A | 10/1999 | D'Angelo et al. | |
| 6,356,196 B1 | 3/2002 | Wong et al. | |
| 7,218,226 B2 | 5/2007 | Wehrenberg | |
| 9,643,722 B1* | 5/2017 | Myslinski | B64C 39/024 |
| 9,671,787 B2* | 6/2017 | Foinet | A63H 27/14 |
| 9,799,185 B2* | 10/2017 | Jessop | G08B 13/2462 |
| 10,028,606 B1* | 7/2018 | Ritchie | A47G 29/12 |
| 10,160,542 B2* | 12/2018 | Myslinski | B64C 39/024 |
| 2016/0033966 A1 | 2/2016 | Farris et al. | |
| 2016/0068264 A1* | 3/2016 | Ganesh | G08G 5/0069 |
| | | | 701/2 |
| 2016/0101874 A1* | 4/2016 | McKinnon | B64F 1/007 |
| | | | 244/114 R |
| 2016/0180667 A1 | 6/2016 | Bunker et al. | |
| 2016/0189101 A1 | 6/2016 | Kantor et al. | |
| 2016/0250535 A1* | 9/2016 | Yatsko | A63H 30/04 |
| | | | 273/317.1 |
| 2016/0313734 A1* | 10/2016 | Enke | G05D 1/0088 |
| 2016/0327389 A1* | 11/2016 | Uzunovic | G01C 17/38 |
| 2016/0343220 A1* | 11/2016 | Grabham | G08B 13/1472 |
| 2017/0006340 A1* | 1/2017 | Enke | H04N 21/440281 |
| 2017/0036771 A1* | 2/2017 | Woodman | B64D 27/26 |
| 2017/0073085 A1* | 3/2017 | Tremblay | A47G 29/141 |
| 2017/0091710 A1 | 3/2017 | Van | |
| 2017/0249581 A1 | 8/2017 | Hens et al. | |
| 2017/0262798 A1* | 9/2017 | Kosseifi | G06Q 10/0833 |
| 2017/0267347 A1* | 9/2017 | Rinaldi | B64D 1/22 |
| 2017/0293297 A1* | 10/2017 | Kim | G08C 17/02 |
| 2017/0293301 A1 | 10/2017 | Myslinski | |
| 2017/0308081 A1* | 10/2017 | Bash | G05D 1/0027 |
| 2017/0309088 A1* | 10/2017 | Arya | H04L 43/0811 |
| 2017/0351900 A1* | 12/2017 | Lee | H04N 5/2257 |
| 2017/0366625 A1* | 12/2017 | Lau | H04L 67/18 |
| 2018/0081351 A1* | 3/2018 | Tankersley | G05D 1/0011 |
| 2018/0105289 A1* | 4/2018 | Walsh | B60L 53/68 |
| 2018/0111684 A1* | 4/2018 | Namgoong | B64C 39/024 |
| 2018/0112980 A1* | 4/2018 | Diem | G01C 17/38 |
| 2018/0150984 A1* | 5/2018 | Enke | G06T 11/60 |
| 2018/0151045 A1* | 5/2018 | Kim | B64C 39/024 |
| 2018/0155023 A1* | 6/2018 | Choi | B64C 39/024 |
| 2018/0157259 A1* | 6/2018 | Myslinski | G08B 21/18 |
| 2018/0170533 A1* | 6/2018 | Lee | B64C 1/08 |
| 2018/0181119 A1* | 6/2018 | Lee | G05D 1/0038 |
| 2018/0188723 A1* | 7/2018 | Lee | G05D 1/0038 |
| 2018/0244404 A1* | 8/2018 | Park | B64F 1/007 |
| 2018/0275685 A1* | 9/2018 | Kim | G06T 7/248 |
| 2018/0312255 A1* | 11/2018 | Illuminati | B64C 39/024 |
| 2018/0324662 A1* | 11/2018 | Phuyal | H04B 7/15 |
| 2018/0356823 A1* | 12/2018 | Cooper | G01C 21/20 |

OTHER PUBLICATIONS

Bergerab, "Backpack Anti-Theft Alarm: 11 Steps (with Pictures)", http://www.instructables.com/id/Backpack-Anti-Theft-Alarm/, Sep. 2, 2014, 9 pages.

"Security mechanism for portable computers", IBM, IP.com Disclosure No. IPCOM000029767D, Jul. 12, 2004, 2 pages.

"Anti-Theft Device for Portable Instruments", IBM, IP.com Disclosure No. IPCOM000042342D, May 1, 1984, 2 pages.

"A method and system for protecting mobile computers from theft using location based services", IBM, IP.com Disclosure No. IPCOM000124636D, May 3, 2005, 3 pages.

NG, "Theft prevention using wireless security system (WSS)," 2008 IEEE International RF and Microwave Conference, 2008, pp. 257-261, 5 pages.

"The Future of Drones: According to the AT&T Foundry", http://www.rocketspace.com/drones, Rocket Space, 2016, 52 pages.

List of IBM Patents or Patent Applications Treated as Related, dated Aug. 20, 2019, 1 page.

Specification "Preventing Anonymous Theft by Drones" and Drawings in U.S. Appl. No. 15/960,933, filed Apr. 24, 2018, 38 pages.

* cited by examiner

PREVENTING ANONYMOUS THEFT BY DRONES

BACKGROUND

The present invention generally relates to securing property and, more particularly, to methods and systems for preventing anonymous theft of property by drones.

Drones (also referred to as unmanned aerial vehicles or UAVs) have become increasingly available to the public. A drone provides a mechanism for a user to perform certain tasks remotely, i.e., without the user being physical present at the location of the task being performed. Concurrently with the rise of popularity and accessibility of drones, online shopping and associated package delivery to residences and places of business has gained immense popularity in recent times.

SUMMARY

In a first aspect of the invention, there is a computer implemented method that includes: accessing, by a tracking server, a secure database that stores data about an object of personal property; determining, by the tracking server and from the data about the object, that a tracking state of the object is set to ON; obtaining, by the tracking server and in response to the determining, altitude data from an altitude sensor of an Internet of Things (IoT) device associated with the object; comparing, by the tracking server, the altitude data to a predefined criteria; and repeating, by the tracking server, the obtaining and the comparing until one of: the altitude data satisfies the predefined criteria, or the tracking state of the object is set to OFF.

In another aspect of the invention, there is a computer program product that includes a computer readable storage medium having program instructions embodied therewith. The program instructions are executable by a computing device to cause the computing device to: access a secure database that stores data about an object of personal property; determine, from the data about the object, that a tracking state of the object is set to ON; obtain, in response to the determining, altitude data from an altitude sensor of an Internet of Things (IoT) device associated with the object; compare the altitude data to a predefined criteria; and repeat the obtaining and the comparing until one of: the altitude data satisfies the predefined criteria, or the tracking state of the object is set to OFF.

In another aspect of the invention, there is a system that includes: a hardware processor, a computer readable memory, and a computer readable storage medium associated with a computing device; program instructions to access a secure database that stores data about an object of personal property; program instructions to determine, from the data about the object, that a tracking state of the object is set to ON; program instructions to obtain, in response to the determining, altitude data from an altitude sensor of an Internet of Things (IoT) device associated with the object; program instructions to compare the altitude data to a predefined criteria; and program instructions to repeat the obtaining and the comparing until one of: the altitude data satisfies the predefined criteria, or the tracking state of the object is set to OFF, wherein the program instructions are stored on the computer readable storage medium for execution by the hardware processor via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to securing property and, more particularly, to methods and systems for preventing anonymous theft of property by drones. Unattended delivery of packages can leave goods exposed to theft and other malicious behaviors once the package/payload is delivered. The confluence of the increase in drone use and the increase in online shopping provides a situation in which a drone may be used with nefarious intent to anonymously take a package that is left on a doorstep after delivery. Aspects of the invention are directed to systems and methods that leverage a secure database that is configured to selectively enable and disable altitude-based tracking of objects such as delivered packages.

In embodiments, an object to be tracked is provided with an IoT (Internet of Things) device that is configured to detect altitude data of the object to which it is attached. One or more trusted entities (such as a merchant or shipping entity) may update the secure database to add data defining a current tracking state for the object (e.g., track or do not track). In embodiments, when the object is delivered and left unattended, a trusted entity updates the secure database to set the tracking state of the object. Based on the state being set for tracking, a server continuously tracks altitude data received from the IoT device associated with the object and generates an alert when the altitude data satisfies a preset criteria, such as a change in altitude exceeding a threshold value as would be expected when the object is lifted away by a drone. In accordance with aspects of the invention, an intended recipient of the object may provide input to one of the trusted entities (e.g., the merchant or shipping entity) indicating that the object has been received, at which point the trusted entity updates the state of the object in the secure database to turn off the tracking. Implementations of the invention thus provide for altitude-based tracking of an unattended object for a time period between a time of delivery of the object and a time of indicated acceptance of the object. In this manner, implementations of the invention provide systems and methods for preventing anonymous theft of objects by drones.

In embodiments, the secure database is a blockchain. In a preferred embodiment, the secure database is a blockchain that can only be modified by a trusted entity (e.g., the merchant, the shipping entity, etc.). In this implementation, the server reads data from the blockchain to determine the state of an object for the purpose of determining whether to track the object. Also in this implementation, the recipient of the package indicates acceptance of the object to one of the trusted entities through a website or mobile application and, based on this indication from the recipient, the trusted entity updates the blockchain to change the state of the object to turn off the tracking.

Implementations of the invention are useful for tracking delivered objects, i.e., after the shipping process is complete. However, aspects of the invention may also be used to selectively track an object during shipping, i.e., while the object is under the control of a merchant and/or one or more shipping entities. Aspects of the invention may also be used with non-delivered objects, such as personal property that is kept outside a residence or place of business.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
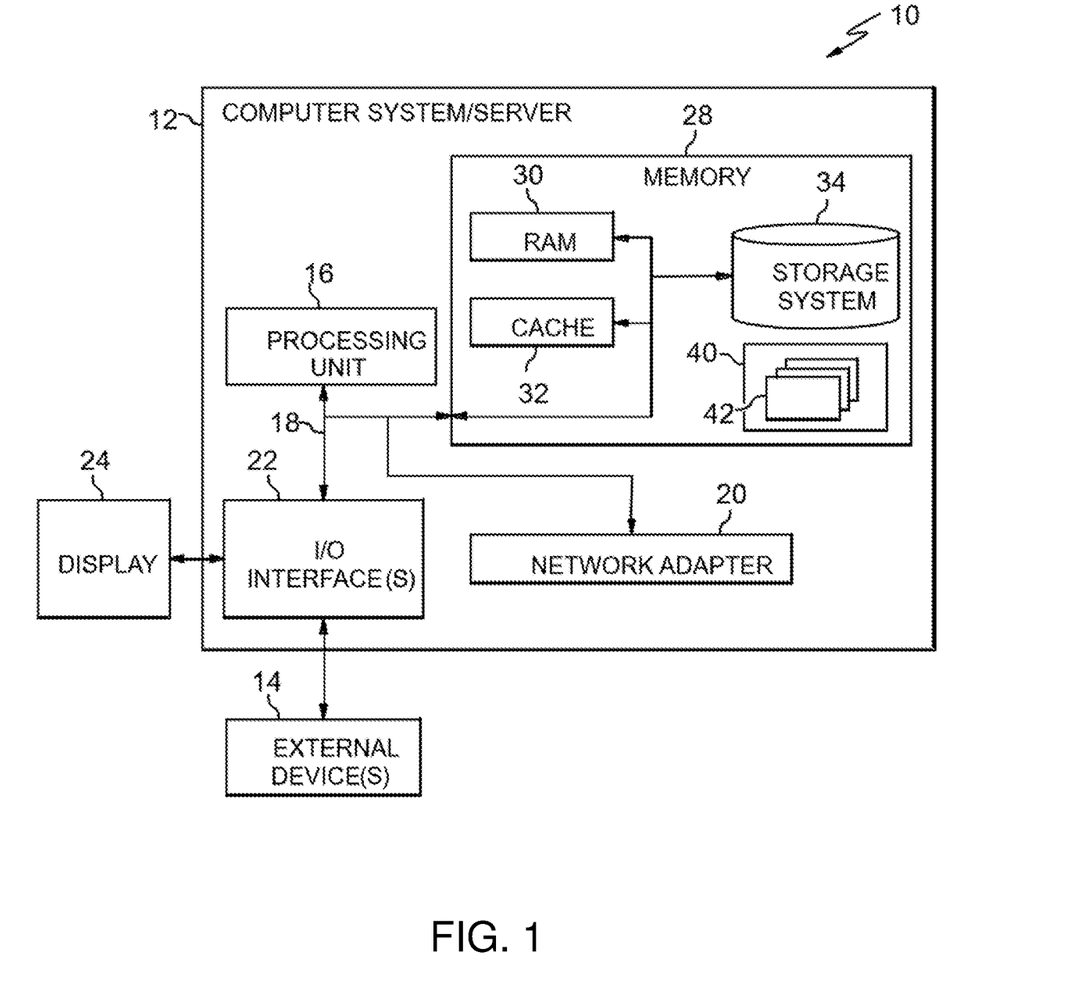
FIG. 1 depicts a computer system in accordance with aspects of the invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
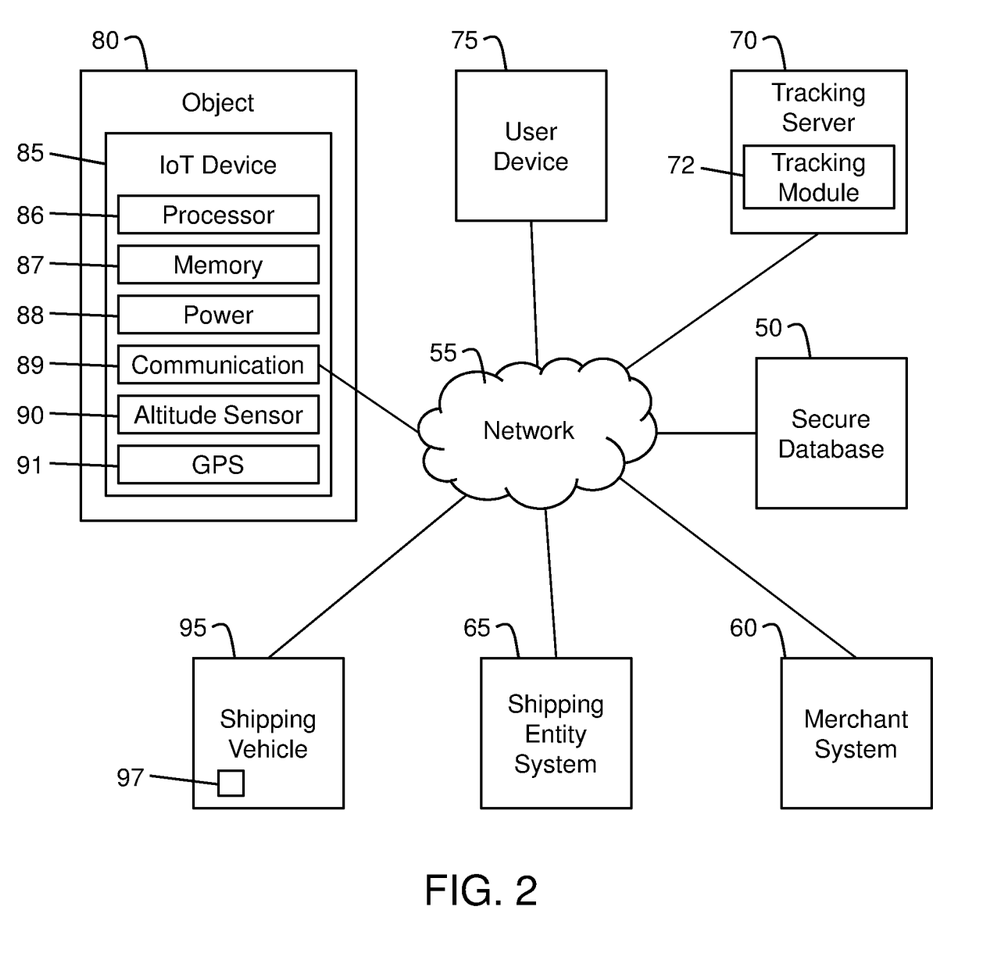
FIG. 2 depicts a block diagram of an illustrative environment in accordance with aspects of the invention.

FIG. 2 depicts a block diagram of an illustrative environment in accordance with aspects of the invention. The environment includes a secure database 50 that stores data defining the state of objects being tracked by the system. In embodiments, the secure database 50 comprises a blockchain, e.g., a distributed blockchain database. For example, the secure database 50 may comprise data storage on plural computer devices connected in a distributed network environment that function as a distributed ledger of the data. Implementations of the invention are not limited to a blockchain, however, and the secure database 50 may comprise, for example, a single computer device that stores and manages data in the manner described herein.

As illustrated in FIG. 2, the secure database 50 is connected to a communication network 55 that may comprise one or more computer networks (such as a LAN, WAN, or the Internet) and/or one or more telecommunications networks (such as a cellular network). In embodiments, a merchant system 60, a shipping entity system 65, a tracking server 70, and a user device 75 are also connected to the network 55. Each of the merchant system 60, the shipping entity system 65, the tracking server 70, and the user device 75 may comprise one or more computer devices such as computer system 12 of FIG. 1.

In embodiments, the merchant system 60 is configured to receive an online shopping order from the user device 75, e.g., via a website or mobile application. In response to receiving the order from the user device 75, the merchant system 60 may be configured to initiate shipping an object 80 defined in the order to a delivery location defined in the order (e.g., a delivery address such as a residence or place of business). The object 80 may comprise personal property such as consumer goods. The merchant system 60 and the shipping entity system 65 may communicate with one another via the network 55 to coordinate shipping the object 80 to the delivery location. The user device 75 may be used to provide input indicating receipt of the object 80 by the intended recipient, the input being provided for example via a website or mobile application of the merchant system 60 or the shipping entity system 65.

According to aspects of the invention, an IoT device 85 is attached to the object 80 while the object 80 is shipped to the delivery location. For example, the IoT device 85 may be placed inside, or otherwise attached to, a cardboard box or an envelope that contains the object 80 being shipped. Other methods of attaching may also be used.

In embodiments, the IoT device 85 comprises a computer processor 86, a computer memory 87, a power source 88, a communication system 89, and an altitude sensor 90. The IoT device 85 may comprise other components, such as a GPS sensor 91. The power source 88 provides electrical power to the components of the IoT device 85. The computer memory 87 stores program code that is run by the computer processor 86 to perform functions described herein. The computer memory 87 may also store data defining a unique identifier of the IoT device 85 relative to other IoT devices associated with other objects in the environment. The communication system 89 comprises at least one antenna that provides for wireless communication via the network 55. The communication system 89 may be configured to employ one or more wireless communication protocols including but not limited to Bluetooth, WiFi, and cellular. The altitude sensor 90 is a sensor that is configured to detect altitude data associated with the IoT device 85. The altitude sensor 90 may comprise, for example, a digital barometric pressure sensor that detects changes in barometric pressure that can be converted to changes in altitude.

In accordance with aspects of the invention, one or more trusted entities are permitted to write data to the secure database 50, via the network 55, to define a state of the object 80. In embodiments, the trusted entities include the merchant system 60 and the shipping entity system 65, although other entities may be defined as trusted entities based on the intended use of the system. In a preferred embodiment, the merchant system 60 creates a new entry for the object 80 in the database upon receipt of the order from the user device 75, and the new entry defines the one or more trusted entities that are permitted to write data to the secure database 50 regarding this object 80. As an example of a new entry for an object 80, the merchant system 60 may enter an identifier of the object 80, an identifier of the IoT device 85 associated with the object 80 (e.g., matching the unique identifier stored in the computer memory 87 of the IoT device 85), and credentials defining one or more trusted entities that are authorized to write to an entry of the secure database 50 associated with this particular object 80 (e.g., to set the tracking state of the object at one or more defined points in the delivery chain).

In implementations, after the merchant system 60 creates the entry for the object 80 in the secure database 50, the one or more trusted entities identified in the initial entry may write new data to the entry associated with the object 80. The data may include: a current location of the object 80, a tracking state of the object, and a timestamp. The current location of the object may be obtained from conventional inventory and shipping management systems that are utilized by the merchant (associated with the merchant system 60) and/or the shipping entity (associated with the shipping entity system 65). In embodiments, the tracking state of the object is a data field that can be set by the trusted entity to one of: a first state to turn ON altitude-based tracking of the object 80, and a second state to turn OFF altitude-based tracking of the object 80. The timestamp may be used to arrange plural data entries associated with a single object 80, such that a latest (e.g., most recent) data entry for the object 80 may be identified.

In embodiments, when the object 80 is delivered to the delivery address and left unattended, a trusted entity (e.g., the merchant system 60 or the shipping entity system 65) updates the secure database 50 to set the tracking state of the object 80 to ON. Based on the tracking state being set to ON in the secure database 50, the tracking server 70 continuously tracks altitude data received from the IoT device 85 associated with the object 80 and generates an alert when the altitude data satisfies a preset criteria, such as a change in altitude exceeding a threshold value as would be expected when the object is lifted away by a drone. In accordance with aspects of the invention, the intended recipient of the object may provide input to one of the trusted entities (e.g., via the user device 75 communicating with the merchant system 60 or the shipping entity system 65) indicating that the object 80 has been received, at which point the trusted entity updates the state of the object in the secure database 50 to turn off the tracking.

Still referring to FIG. 2, in accordance with aspects of the invention, the tracking server 70 accesses the secure database 50, via the network 55, to determine the tracking state of the object 80. The tracking server 70 may comprise a tracking module 72, which may be one or more program modules 42 as described with respect to FIG. 1 and that is configured to perform one or more of the functions described herein. In embodiments, the tracking module 72 periodically reads the latest data entry in the secure database 50 associated with the object 80 to determine the current tracking state of the object 80 as defined in the secure database 50. One the one hand, when the tracking module 72 determines the tracking state for the object 80 is OFF, the tracking module 72 takes no action regarding tracking the altitude of the object 80 and waits a predefined amount of time until again reading the latest data entry in the secure database 50 associated with the object 80 to determine the current tracking state of the object 80. On the other hand, when the tracking module 72 determines the tracking state for the object 80 is ON, the tracking module 72 continuously obtains altitude data from the IoT device 85 associated with the object 80 and compares the altitude data to one or more predefined criteria.

In embodiments, the tracking module 72 obtains the altitude data from the IoT device 85 via communication through the network 55. For example, the tracking module 72 may pull the altitude data from the IoT device 85 at repeated time intervals that are sufficiently small as to be considered continuous. In another example, the IoT device 85 may be configured to continuously push its altitude data to the tracking server 70, and the tracking module 72 may disregard the pushed altitude data when the tracking state for the object 80 is OFF and utilize the pushed altitude data when the tracking state for the object 80 is ON.

In aspects, the one or more predefined criteria comprise a threshold value representing a change in altitude. In this manner, the tracking module 72 continuously analyzes values of the altitude data from the IoT device 85, and determines whether the altitude data changes by more than the threshold value. In the event the tracking module 72 determines the altitude data does not change by more than the threshold value, the tracking module 72 continues the tracking without generating an alert. In the event the tracking module 72 determines the altitude data does change by more than the threshold value, the tracking module 72 generates an alert. The threshold value may be initially set to a default value, and may be adjusted as a configuration setting in the system. For example, the tracking server 70 may receive input defining the threshold value from one or more of the merchant system 60, the shipping entity system 65, and the user device 75, and the tracking server 70 may store and subsequently utilize a new threshold value based on the input.

According to aspects of the invention, the tracking module 72 sends the generated alert to at least one designated alert recipient, which may include at least one of: one of the trusted entities (e.g., the merchant system 60 or the shipping entity system 65), the user device 75 of the intended recipient of the object, law enforcement, and other designated people. The alert may be a message (e.g., text message, email, smartphone notification, etc.) that is communicated by the tracking server 70 via the network 55. The alert may include a designation of the object 80 and last known location of the object 80, which may be determined by the tracking server 70 from accessing data stored in the secure database 50. The alert can also include an altitude of the object as determined from the altitude data obtained from the IoT device 85. In embodiments, the tracking server 70 may continue to obtain altitude data from the IoT device 85 and periodically send (to the at least one designated alert recipient) an updated alert that includes updated altitude data for the object 80. In this manner, the tracking server 70 may provide real-time updates of the altitude of the object after the alert is initially generated.

In embodiments, the designated alert recipient(s) may be defined as a configuration option in the system by storing data defining their contact information. For example, the tracking server 70 may receive input defining the designated alert recipient(s) from one or more of the merchant system 60, the shipping entity system 65, and the user device 75, and the tracking server 70 may store and subsequently utilize the designated alert recipient(s) when an alert is generated and sent. For example, an intended recipient of the object 80 may designate their neighbor as a designated alert recipient so that the neighbor can visually look at the intended recipient's delivery location (e.g., front porch) when an alert is received.

In embodiments, the IoT device 85 includes a sensor configured to determine a location of the object, such as a GPS sensor 91. In this manner, when the tracking module 72 generates the alert in response to the altitude data satisfying the preset criteria, the IoT device 85 may transmit location data to the tracking module 72 so that the object 80 can be tracked using the location data. The tracking module 72 may transmit the location data to the designated alert recipients. In this manner, GPS-based tracking of the object 80 may be initiated based on the altitude-based tracking triggering the alert.

In embodiments, the tracking server 70 may continue to obtain altitude data and GPS data from the IoT device 85 and periodically send (to the at least one designated alert recipient) an updated alert that includes the updated altitude data and GPS data for the object 80. In this manner, the tracking server 70 may provide real-time updates of the altitude and GPS location of the object 80 after the alert is initially generated.

Figure 3:
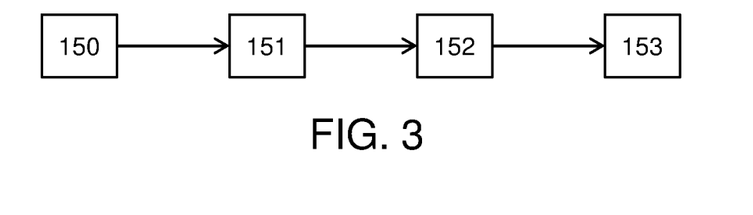
FIG. 3 depicts an exemplary delivery scenario in accordance with aspects of the invention.

FIG. 3 depicts an exemplary shipping scenario of the object 80 from a merchant to the delivery location. In the exemplary shipping scenario, the object 80 is initially at merchant facility 150. Upon receiving the order from the user device 75, the object 80 is packaged with the IoT device 85 and moved (e.g., by ground transportation) from the merchant facility 150 to a first shipping entity facility 151. The object 80 packaged with the IoT device 85 is then moved (e.g., by air transportation) from the first shipping entity facility 151 to a second shipping entity facility 152. The object 80 packaged with the IoT device 85 is then moved (e.g., by ground transportation or drone delivery) from the second shipping entity facility 152 to the delivery location 153 and left unattended at the delivery location 153. In accordance with aspects of the invention described thus far, the merchant system 60 or the shipping entity system 65 updates the secure database 50 to set the tracking state to ON when the object 80 is left unattended at the delivery location 153. As described herein, the tracking server 70 then continuously tracks the altitude data of the IoT device 85 packaged with the object 80 and generates an alert if the altitude data changes by more than a predefined amount. In the event the intended recipient of the object 80 indicates receipt of the object 80 (e.g., via the user device 75), then the merchant system 60 or the shipping entity system 65 updates the secure database 50 to set the tracking state to OFF, and the tracking server 70 stops tracking the altitude data of the IoT device 85 packaged with the object 80.

Implementations of the invention are useful for tracking delivered objects, i.e., after the shipping process is complete. However, aspects of the invention may also be used to selectively turn the tracking state of the object 80 on and off during shipping, i.e., while the object 80 is under the control of the merchant and/or one or more shipping entities. In an exemplary use case, the shipping entity system 65 may update the secure database 50 to set the tracking state to ON when the object 80 is expected to sit idle, e.g., at a warehouse or intermediate facility. For example, the shipping entity system 65 may update the secure database 50 to turn on tracking at a first time when the object 80 is expected to sit idle, e.g., at facility 151. The shipping entity system 65 may subsequently update the secure database 50 to turn off tracking at a second time when the object 80 is in transit, e.g., carried by an airplane from facility 151 to facility 152. The shipping entity system 65 may subsequently update the secure database 50 to turn on tracking again when the object 80 is delivered to an unattended location defined by the intended recipient, e.g., at delivery location 153. In this manner, aspects of the invention may be used to track objects both during shipment (i.e., prior to delivery) and after delivery.

In another exemplary use case, the shipping entity system 65 may update the secure database 50 to turn on tracking of the object 80 when the object 80 is carried by an airborne shipping vehicle 95 comprising an altimeter 97. In this use case, the tracking module 72 may compare altitude data of the airborne shipping vehicle 95 (obtained from altimeter 97) to the altitude data of the IoT device 85 (obtained from altitude sensor 90), and the tracking module 72 may generate an alert when the altitude data of the airborne shipping vehicle 95 and the altitude data of the IoT device 85 deviate from one another by more than a predefined amount. In this manner, aspects of the invention may be used to track the object 80 based on comparing a detected altitude to an expected altitude.

For example, in the event the object 80 is scheduled to be shipped in an airplane flying from facility 151 to facility 152, and the altitude of the IoT device 85 of the object 80 does not match the altitude of the airplane (within a predefined tolerance), this determination can be used to infer that the object 80 is not in the airplane and thus is misplaced. In another example, in the event the object 80 is scheduled to be carried by a delivery drone for scheduled delivery (e.g., from facility 152 to delivery location 153), and the altitude of the IoT device 85 of the object 80 unexpectedly experiences a large delta compared to the altitude of the delivery drone, this determination can be used to infer that the object 80 unintentionally disengaged from the delivery drone (e.g., was unintentionally dropped by the delivery drone). In this manner, aspects of the invention may be used to track the object 80 during shipment and prior to delivery, and are not limited to tracking the object after the object has been delivered and left unattended.

Implementations of the invention are useful for tracking delivered objects. However, aspects of the invention may also be used with other objects, such as personal property that is kept outside a residence or place of business. As but one example, a user may wish to attach an IoT device 85 as described herein to their cooking grill that is kept in their yard. In this implementation, the trusted entity may comprise a service provider that accesses the secure database 50 on behalf of the user, e.g., as part of a subscription. The user may communicate with the service provider through a website and/or mobile application to instruct the service provider to selectively turn on and off the altitude based tracking for an identified IoT device 85. In this manner, the user may attach the IoT device 85 to their grill that is stored outside, instruct the service provider to turn on tracking of the IoT device 85, and receive an alert from the service provider in the event that the service provider detects that the altitude of the IoT device 85 changes by more than a predefined threshold amount.

In embodiments, the merchant system 60, the shipping entity system 65, and the tracking server 70 are each controlled by separate entities. In another embodiment, the merchant system 60 and the shipping entity system 65 may be combined into a single system in situations where a single entity performs the functions of both. In another embodiment, the merchant system 60 and the tracking server 70 may be controlled by a same entity.

Figure 4:
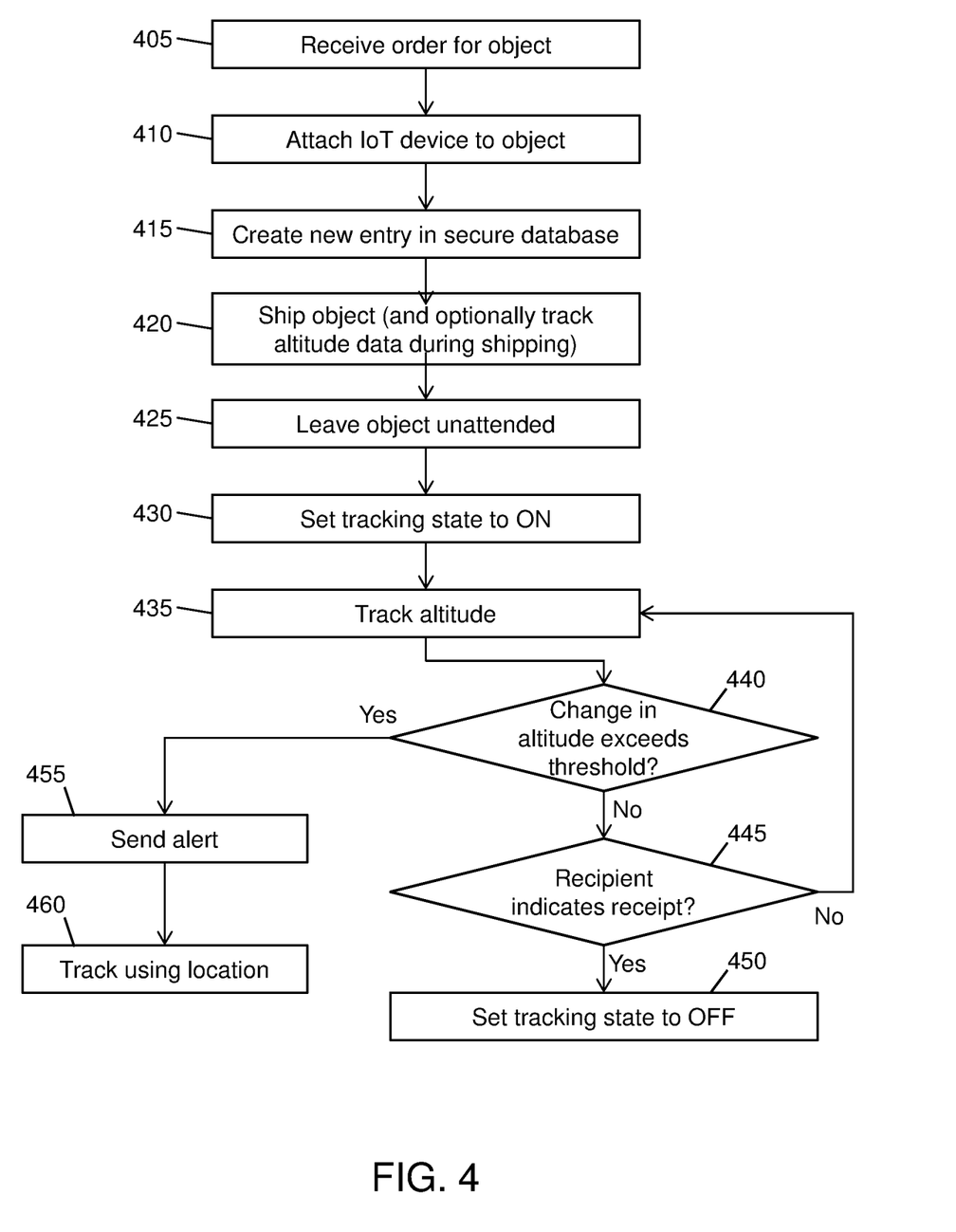
FIG. 4 depicts a flowchart of an exemplary method in accordance with aspects of the invention.

FIG. 4 depicts a flowchart of an exemplary method in accordance with aspects of the invention. The steps of the method may be performed in the environment of FIG. 2 and are described with reference to the elements and steps described with respect to FIGS. 2 and 3.

At step 405, a merchant receives an order for an object. In embodiments, as described with respect to FIG. 2, step 405 comprises the merchant system 60 receiving the order for the object 80 from the user device 75 via the network 55.

At step 410, the merchant attaches an IoT device to the object. In embodiments, as described with respect to FIG. 2, the IoT device 85 may be placed inside, or otherwise attached to, a cardboard box or an envelope that contains the object 80 being shipped.

At step 415, the merchant creates a new entry for the object in the secure database. In embodiments, as described with respect to FIG. 2, step 415 comprises the merchant system 60 accessing the secure database 50 and creating a new entry for the object 80. The new entry may contain: an identifier of the object 80, an identifier of the IoT device 85 associated with the object 80, and credentials defining one or more trusted entities that are authorized to set the tracking state of the object at one or more defined points in the delivery chain. The new entry may also set the tracking state of the object 80 to OFF.

At step 420, the merchant and/or one or more shipping entities ships the object. The physical acts involved in shipping the object 80 may be performed using conventional techniques including but not limited to: humans and/or automated systems moving the object 80 within various facilities; vehicles such as aircraft, trains, and/or automobiles moving the object 80 between various locations during legs of the shipping; and human or drone delivery of the object 80 in the last leg of the shipping (e.g., delivery to the delivery location). In embodiments, as described with respect to FIGS. 2 and 3, the tracking state of the object 80, as defined in the secure database 50, may be set as OFF during shipping such that altitude-based tracking of the object 80 is not performed during shipping. Alternatively, one or more trusted entities may write data to the secure database 50 to selectively set the tracking state to ON or OFF at different locations throughout the shipping (e.g., to provide tracking while the object is sitting idle at a facility, to compare the altitude data of the IoT device to altitude data of a shipping vehicle, etc.). In this manner, the tracking server 70 may perform altitude-based tracking during selected legs of the shipping, as described with respect to FIG. 3.

At step 425, the shipping entity leaves the object unattended. In embodiments, as described with respect to FIG. 2, the shipping entity delivers the object 80 to the delivery location and leaves the object 80 unattended at the delivery location. For example, the shipping entity may leave the object 80 unattended on the front porch of the residence of the intended recipient.

At step 430, the shipping entity sets the tracking state of the object to ON. In embodiments, based on leaving the object unattended, the shipping entity system 65 accesses the secure database 50 and sets the tracking state of the object 80 to ON, as described with respect to FIG. 2.

At step 435, the tracking server tracks the altitude of the object. In embodiments, as described with respect to FIG. 2, the tracking module 72 of the tracking server 70 continuously obtains altitude data from the IoT device 85 associated with the object 80 and compares the altitude data to one or more predefined criteria. Step 435 may also include the tracking server 70 periodically checking the secure database 50 to determine whether the tracking state is set to ON or OFF, as described with respect to FIG. 2, and the tracking may be performed based on determining the tracking state is ON.

At step 440, the tracking server determines whether a change in the altitude of the object exceeds a predefined threshold value. In embodiments, as described with respect to FIG. 2, the tracking module 72 analyzes the continuously obtained altitude data from the IoT device 85 and determines whether the altitude data changes by more than the predefined threshold value.

In the event the altitude data does not change by more than the predefined threshold value, then at step 445 the tracking server determines whether the recipient has indicated receipt of the object. In embodiments, as described with respect to FIG. 2, the intended recipient of the object 80 may provide input to user device 75 indicating that they received the object 80. In the event that the recipient has not indicated receipt of the object, then the process returns to step 435 at which the tracking server 70 continues to track the altitude of the object. In the event that the recipient has indicated receipt of the object, then at step 450 the system causes the tracking state to be set to OFF. For example, in response to receiving the recipient indication that the object has been received, the merchant system 60 or the shipping entity 65 updates the secure database 50 to set the tracking state to OFF.

Alternatively, when the tracking server 70 determines at step 440 that the altitude data exceeds the threshold amount, then at step 455 the tracking server 70 generates and sends an alert. In embodiments, as described with respect to FIG. 2, the tracking server 70 stores data that defines contact information for at least one designated alert recipient, and step 455 comprises the tracking server 70 sending a message to the at least one designated alert recipient via the network 55. The alert may include a designation of the object 80 and last known location of the object 80. The alert can also include an altitude of the object as determined from the altitude data obtained from the IoT device 85. Step 455 may comprise the tracking server 70 continuing to obtain altitude data from the IoT device 85 and periodically sending an updated alert that includes updated altitude data for the object 80.

Optionally, at step 460 the tracking server 70 tracks the object 80 using location data obtained from the IoT device 85. In embodiments, as described with respect to FIG. 2, the tracking server 70 may obtain GPS data from the IoT device 85 to determine a GPS location of the object after the alert has been triggered. The tracking module 72 may transmit the location data to the designated alert recipients and may continue to obtain one or both of altitude data and location data from the IoT device 85 and provide real time updates to the at least one designated alert recipient.

From the description of the exemplary environment depicted in FIG. 2 and the exemplary method depicted in FIG. 4, it will be apparent that the tracking server 70 may be configured to: access the secure database 50 that stores data about the object 80; determine, from the data about the object 80, that a tracking state of the object 80 is set to ON; obtain, in response to the determining that the tracking state is set to ON, altitude data from the altitude sensor 90 of the IoT device 85 associated with the object 80; compare the altitude data to a predefined criteria; and repeat the obtaining and the comparing until one of: the altitude data satisfies the predefined criteria, or the tracking state of the object 80 is set to OFF.

Advantageously, embodiments of the present invention provide technical solutions to the problem of anonymous theft of unattended property by drones, by providing a system that can selectively apply altitude-based tracking of an IoT device associated with the property. In implementations, the system performs an unconventional ordered arrangement of steps that includes accessing a secure database (such as a blockchain) to determine whether altitude based tracking is set, and obtaining altitude data from an altitude sensor-equipped IoT device based on the determining.

In embodiments, a service provider could offer to perform the processes described herein. In this case, the service provider can create, maintain, deploy, support, etc., the computer infrastructure that performs the process steps of the invention for one or more customers. These customers may be, for example, any business that uses cloud computing technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

In additional embodiments, the GPS data of the IoT device can be further combined with latitude and longitude geo-fencing techniques to provide more stringent tracking.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method, comprising:
accessing, by a tracking server, a secure database that stores data about an object of personal property;
determining, by the tracking server and from the data about the object, that a tracking state of the object is set to ON;
obtaining, by the tracking server and in response to the determining, altitude data from an altitude sensor of an Internet of Things (IoT) device associated with the object;
comparing, by the tracking server, the altitude data to a predefined criteria; and
repeating, by the tracking server, the obtaining and the comparing until the altitude data satisfies the predefined criteria or the tracking state of the object is set to OFF,
wherein the secure database is configured such that the data about the object defines one or more trusted entities;
only the one or more trusted entities have permission to update the tracking state, of the object, that is stored in the secure database;
the tracking state of the object is set to OFF when the object is being shipped; and
the tracking state of the object is set to ON when the object is delivered and left unattended at a delivery location defined by an intended recipient that ordered the object.

2. The computer implemented method of claim 1, the tracking state of the object is permanently set to OFF based on an indication from the intended recipient that the object has been received.

3. The computer implemented method of claim 1, wherein the one or more trusted entities include at least one selected from the group consisting of: a merchant that received an order for the object from an intended recipient of the object; and a shipping entity that ships the object from the merchant to the intended recipient.

4. The computer implemented method of claim 1, wherein the secure database comprises a blockchain.

5. A computer implemented method, comprising:
accessing, by a tracking server, a secure database that stores data about an object of personal property;
determining, by the tracking server and from the data about the object, that a tracking state of the object is set to ON;
obtaining, by the tracking server and in response to the determining, altitude data from an altitude sensor of an Internet of Things (IoT) device associated with the object;
comparing, by the tracking server, the altitude data to a predefined criteria; and
repeating, by the tracking server, the obtaining and the comparing until the altitude data satisfies the predefined criteria or the tracking state of the object is set to OFF,
wherein the secure database is configured such that the data about the object defines one or more trusted entities;
only the one or more trusted entities have permission to update the tracking state, of the object, that is stored in the secure database; and
the secure database is configured such that:
the tracking state of the object may be selectively set to one of ON and OFF by the one or more trusted entities while the object is being shipped;
the tracking state of the object is set to ON when the object is delivered and left unattended at a delivery location defined by an intended recipient that ordered the object; and
the tracking state of the object is permanently set to OFF based on an indication from the intended recipient that the object has been received.

6. The computer implemented method of claim 5, wherein the one or more trusted entities include at least one selected from the group consisting of: a merchant that received an order for the object from an intended recipient of the object; and a shipping entity that ships the object from the merchant to the intended recipient.

7. The computer implemented method of claim 5, wherein the secure database comprises a blockchain.

8. A computer implemented method, comprising:
accessing, by a tracking server, a secure database that stores data about an object of personal property;
determining, by the tracking server and from the data about the object, that a tracking state of the object is set to ON;
obtaining, by the tracking server and in response to the determining, altitude data from an altitude sensor of an Internet of Things (IoT) device associated with the object;
comparing, by the tracking server, the altitude data to a predefined criteria; and
repeating, by the tracking server, the obtaining and the comparing until the altitude data satisfies the predefined criteria or the tracking state of the object is set to OFF,
wherein the secure database is configured such that the data about the object defines one or more trusted entities; and only the one or more trusted entities have permission to update the tracking state, of the object, that is stored in the secure database;
further comprising obtaining, by the tracking server and in response to the determining, altitude data from an altitude sensor of an airborne shipping vehicle scheduled to be carrying the object, and
determining, by the tracking server, a difference between the altitude data from the altitude sensor of the IoT device and the altitude data from the altitude sensor of the airborne shipping vehicle,
wherein the comparing comprises comparing a difference to the predefined criteria.

9. The computer implemented method of claim 8, wherein the one or more trusted entities include at least one selected from the group consisting of: a merchant that received an order for the object from an intended recipient of the object; and a shipping entity that ships the object from the merchant to the intended recipient.

10. The computer implemented method of claim 8, wherein the secure database comprises a blockchain.

\* \* \* \* \*